(12) United States Patent
Carney et al.

(10) Patent No.: US 10,909,036 B2
(45) Date of Patent: Feb. 2, 2021

(54) MANAGEMENT OF SHARED MEMORY USING ASYNCHRONOUS INVALIDATION SIGNALS

(71) Applicant: International Business Machines Corporation, Armonk, NY (US)

(72) Inventors: Allen Carney, Saugerties, NY (US); David Surman, Milton, NY (US); William Charles Neiman, Poughkeepsie, NY (US); Georgette Kurdt, Wappingers Falls, NY (US); Scott F. Schiffer, Poughkeepsie, NY (US); Michael Lawrence Greenblatt, Jefferson Hills, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/186,135

(22) Filed: Nov. 9, 2018

(65) Prior Publication Data
US 2020/0151096 A1    May 14, 2020

(51) Int. Cl.
*G06F 12/08*    (2016.01)
*G06F 9/38*    (2018.01)
(Continued)

(52) U.S. Cl.
CPC ........ *G06F 12/0815* (2013.01); *G06F 9/3871* (2013.01); *G06F 9/52* (2013.01); *G06F 9/544* (2013.01); *G06F 12/084* (2013.01)

(58) Field of Classification Search
CPC .. G06F 12/0815; G06F 12/084; G06F 9/3871; G06F 9/52; G06F 9/544
See application file for complete search history.

(56) References Cited

U.S. PATENT DOCUMENTS 5,265,232 A * 11/1993 Gannon ................ G06F 12/082
                                                       711/124
5,537,574 A     7/1996 Elko et al.
(Continued)

OTHER PUBLICATIONS

Bukhari, Fahren; "Maintaining Consistency in Client-Server Database Systems with Client-Side Caching", Newcastle University, 2012, 120 Pages.
(Continued)

*Primary Examiner* — Masud K Khan
(74) *Attorney, Agent, or Firm* — Cantor Colburn LLP; Teddi Maranzano

(57) ABSTRACT

A system includes a shared memory accessible by a plurality of members of a shared memory system, and a processor operably coupled to the shared memory system. The processor is configured to receive a command from an exploiting member of the plurality of members, the command instructing an update to a piece of shared data, perform the update to the piece of shared data, and send an invalidation signal to each other member of the plurality of members. An invalidation signal sent to a respective member indicates that a local copy of the piece of data stored by the respective member is no longer valid, and each invalidation signal is sent asynchronously with respect to processing of the command. The processor is further configured to return the results of the command to the exploiting member.

17 Claims, 3 Drawing Sheets

(51) Int. Cl.
    *G06F 9/52*     (2006.01)
    *G06F 9/54*     (2006.01)
    *G06F 12/0815*     (2016.01)
    *G06F 12/084*     (2016.01)

(56) References Cited

U.S. PATENT DOCUMENTS

| | | |
|---|---|---|
| 5,544,345 A * | 8/1996 | Carpenter ............ G06F 12/084 |
| | | 711/141 |
| 6,715,059 B2 | 3/2004 | Miller |
| 7,945,577 B2 | 5/2011 | Altinel et al. |
| 8,578,373 B1 | 11/2013 | Krishnan et al. |
| 9,280,591 B1 | 3/2016 | Kharatishvili et al. |
| 9,535,924 B2 | 1/2017 | Mackenzie et al. |
| 2003/0130984 A1* | 7/2003 | Quinlan ................... G06F 9/52 |
| 2019/0102297 A1* | 4/2019 | Jaskiewicz ............ G06F 12/084 |

OTHER PUBLICATIONS

Anonymous et al., "Method for Concurrent Implementation of Reference Counts by using Hardware Transactional Memory (HTM)", Ip.com, 2014, 11 pages.

Anonymous et al.; "Method for efficient handling of resource affinity in a workload managed multi-process middleware environment", IP.com, 2015, 9 pages.

Anonymous, et al., "Smart data transfer for Enterprise monitoring"; Ip.com; 2011, 5 pages.

Franklin, Michael J. et al.; "Transactional Client-Server Cache Consistency: Alternatives and Performance"; ACM Transactions on Database Systems, 1997, 44 pages.

* cited by examiner

MANAGEMENT OF SHARED MEMORY USING ASYNCHRONOUS INVALIDATION SIGNALS

BACKGROUND

The present invention relates to computing systems having shared memory, and more specifically, to a method, system and computer program product that allows a program to manage commands and updates to shared data while maintaining local cache consistency.

In the field of computers or computing systems, it is common to connect or cluster together a plurality of computing systems that share data, e.g., in a shared cache. One such system is known as a parallel systems complex or "sysplex." The sysplex configuration provides for parallel computing and data and computing resource sharing by multiple users to thereby improve overall workload processing.

SUMMARY

According to one or more embodiments of the present invention, a system includes a shared memory accessible by a plurality of members of a shared memory system, and a processor operably coupled to the shared memory system. The processor is configured to receive a command from an exploiting member of the plurality of members, the command instructing an update to a piece of shared data, perform the update to the piece of shared data, and send an invalidation signal to each other member of the plurality of members. An invalidation signal sent to a respective member indicates that a local copy of the piece of data stored by the respective member is no longer valid, and each invalidation signal is sent asynchronously with respect to processing of the command. The processor is further configured to return the results of the command to the exploiting member.

According to one or more embodiments of the present invention, a method of managing access to shared data stored in a shared memory system includes receiving a command by a processor from an exploiting member of a plurality of members of the shared memory system, the plurality of members having access to the shared memory, the command instructing an update to a piece of shared data. The method also includes sending an invalidation signal to each other member of the plurality of members, and returning the results of the command to the exploiting member. An invalidation signal sent to a respective member indicates that a local copy of the piece of data stored by the respective member is no longer valid, and each invalidation signal is sent asynchronously with respect to processing of the command.

According to one or more embodiments of the present invention, a computer program product includes a computer readable storage medium having program instructions embodied therewith. The program instructions are executable by a processing system to receive a command by a processor from an exploiting member of a plurality of members of the shared memory system, the plurality of members having access to the shared memory, the command instructing an update to a piece of shared data. The program instructions are also executable by the processing system to send an invalidation signal to each other member of the plurality of members, and return the results of the command to the exploiting member. An invalidation signal sent to a respective member indicates that a local copy of the piece of data stored by the respective member is no longer valid, and each invalidation signal is sent asynchronously with respect to processing of the command.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

One or more embodiments of the present invention provide a mechanism for improving the performance of a computer or computer system having a shared memory that is accessible by multiple members. A control device in a shared memory system, such as a processor, CPU or a coupling facility in a parallel system complex ("sysplex"), is configured to manage access to shared memory by registered members, and performs a method that includes notifying members of the system when a member updates a piece of shared data, by sending asynchronous invalidation signals. The asynchronous invalidation signals notify each member that each member's local copy of the piece of shared data is no longer valid. It is noted that a "control device" may be any hardware or software entity that can control aspects of the shared memory system, such as a processing circuit, program or virtual entity.

In one embodiment, the asynchronous invalidation signals are cross-invalidation (XI) signals, which are delivered asynchronously relative to each update of a shared piece of data (e.g., a page or cache line). The control device such as a coupling facility (CF) then performs a check to make sure all asynchronous XI signals have been completed. In one embodiment, commands that generate asynchronous XI signals are given sequence numbers to be generated and returned on a command. Each sequence number represents one XI signal or a group of asynchronous XI signals that are generated as a result of the command. The asynchronous XI signal(s) is/are sent to each member other than the member that initiated the command. Sequence numbers may be generated and maintained by the CF (or other processor or control device) for each of the data sharing members that initiate commands that result in asynchronous XI signals. The sequence numbers may be used on a sync-up request to ensure all asynchronous XI signals have completed.

One or more embodiments of the present invention provide technological improvements over current systems and methods. For example, when data sharing members are at a distance from a shared cache or shared memory, notifying members that a piece of data is invalid can result in significant processing delays. Embodiments described herein allow sending and processing of XI signals asynchronously, which substantially reduces or eliminates such processing delays.

Figure 1:
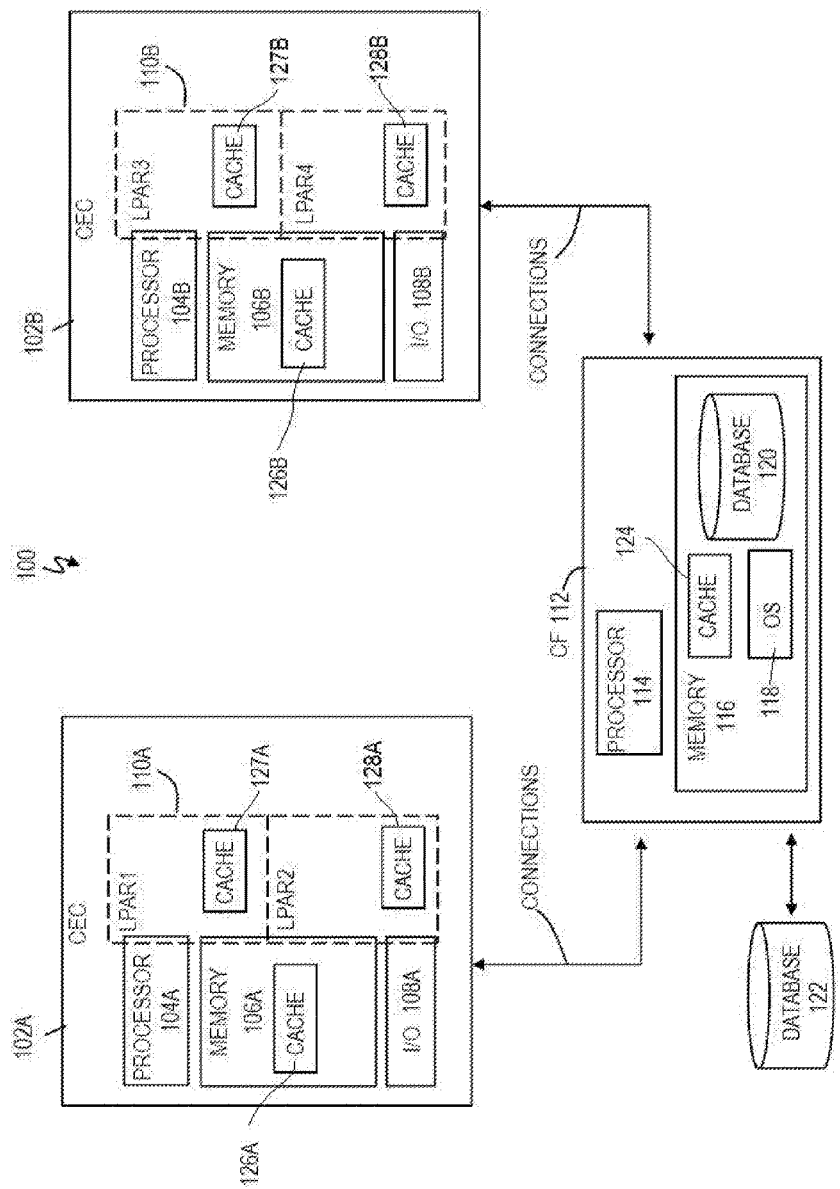
FIG. 1 is a block diagram showing a shared memory system including a plurality of members and a control device, according to one or more embodiments of the present invention.

FIG. 1 illustrates an example of a shared memory system 100 having a shared memory that is accessible by a plurality of computing devices or instances. Such computing devices or instances are referred to herein as "members," which may be hardware devices, software programs, virtual processors or any other computing entity.

In this example, the shared memory system 100 is configured as a parallel system complex or "sysplex" 100, which includes a collection of computing systems or instances (e.g., z/OS® systems) that cooperate, using certain hardware and software products, to process work. The sysplex 100 is accessible by a plurality of members, which may be separate hardware devices and/or logical devices.

The sysplex 100 includes processing devices, which in this example are configured as mainframes having central electronic complexes (CECs) 102A and 102B, generally referred to as CECs 102. Central electronic complex (CEC) and central processor complex (CPC) can be used interchangeably, and refer to the physical collection of hardware that includes main storage, one or more central processors, timers, and channels as understood by one skilled in the art. Each CEC 102A and 102B and/or instance in the CECs 102A and 102B that has an interest in shared data is registered as a member of the sysplex 100. It is noted that a member may be any suitable hardware or data sharing software program, and is not limited to the CECs 102. It is further noted that the embodiments described herein are discussed for illustrative purposes in conjunction with the sysplex 100 and the CECs 102, but may be utilized in conjunction with any suitable processing device or system having a shared storage.

The CEC 102A includes a processor 104A, memory 106A and an input/output (110) channel 108A. CEC 102B includes a processor 104B, memory 106B and an I/O channel 108B. The CEC 102A may include a number of logical partitions (LPARs) 110A, referred to as LPAR1 and LPAR2. Similarly, the CEC 102B may include a number of LPARs 110B, such as LPAR3 and LPAR4. The LPARs 110A and 110B run on and utilize the resources (such as processors, memory, 110 channels, etc.) on the respective CEC 102A and CEC 102B. In this embodiment, each LPAR is a distinct member of the sysplex 100.

In one embodiment, each member of the sysplex 100 is connected to a shared memory control device or controller. For example, the sysplex 100 may be configured as a parallel sysplex, and include a coupling facility (CF) 112. The CF 112 may be a separate machine as shown in FIG. 1, or an LPAR. The CF 112 includes a processor 114 and a memory 116 that includes an operating system (OS) 118. The CF 112 can be a mainframe processor, defined through a hardware management console (HMC), with memory and special channels (CF links), and a specialized operating system called coupling facility control code (CFCC).

The CF 112 manages access to shared data, which may be stored in one or more main storage locations, such as a database 120 in the CF 112 and/or in an external or remote database 122. The CF 112 includes various cache structures, such as a shared data cache structure 124 that includes one or more caches. The cache structure 124 can store copies of data that is shared among members. Members can read data from a main storage location and/or from the cache structure 124, and can write data to a main storage location and/or to the cache structure 124. In one embodiment, each member includes its own local cache structures for temporary storage of copies of shared data. For example, the CEC 102A, LPAR1 and LPAR2 each have a respective local cache structure 126A, 127A and 128A. Likewise, the CEC 102B, LPAR3 and LPAR4 each have a respective local cache structure 126B, 127B and 128B.

As noted above, the CF 112 stores shared data that is shared by different data sharing members, and each member can access the shared data and store a local copy in memory, e.g., a local cache structure.

In one embodiment, the system 100 utilizes serializing operations applied to shared data to ensure that updates are made in a consistent manner, i.e., no other members can make updates to a piece of shared data (e.g., a database page or cache line) while a member is updating the piece of shared data.

In one embodiment, for a parallel sysplex, serializing data access is achieved by using a lock structure in the CF 112. When a member wants to work with a piece of data, the member sends a lock request to the CF 112, identifying the record in question and the type of access requested. If the request is for shared access, and no other member has exclusive access, the CF 112 grants the request. If the request is for exclusive access, and no other member is currently accessing the record, the CF 112 grants the request. A member that requests and is granted access to a piece of shared data is referred to herein as an "exploiting member."

The system 100 (or other suitable shared memory system) is configured to ensure consistency across all of the local caches maintained by members. The system 100 accomplishes this by sending invalidation signals to each member other than the exploiting member, when the exploiting member updates a piece of shared data. Such signals notify each other member that a piece of data in their local storage is no longer valid. In current systems, such signals are sent and processed synchronously with respect to processing the update.

When an exploiting member updates shared data, in one embodiment, a mechanism is provided so that each member notifies the CF 112 every time it adds a record to its local buffer and every time it updates a record. The CF 112 thus is aware of which members have a copy of any given piece of data, and which members it should notify when a given record is updated. This process is referred to as cross-invalidation, and it is handled automatically by the members and the CF 112.

For example, if LPAR1 writes to or updates a piece of shared data, LPAR1 retrieves a copy of the shared data and stores the copy in the local cache structure 127A, updates the shared data, and writes the update to the cache structure 124 in the CF 112 and/or main memory. At this point, other members' copies of the updated piece of shared data are no longer valid. The CF 112 sends cross-invalidation (XI) signals to the other members to notify the other members that their local copies of the piece of shared data are invalid. The other members then invalidate their local copies and may proceed to get the updated version.

In traditional sysplex environments, when an exploiting member writes a piece of changed data to the cache structure 124 in the CF 112, the exploiting member sends a write request to the CF 112, and the CF 112 sends synchronous cross invalidate (XI) signals to the other members indicating that piece of data is no longer valid. With the synchronous XI protocol, the XI signals sent to each data sharing member complete the invalidation process before the original write request to the cache structure 124 in the CF 112 can complete. For transactional processing, a transaction will generally obtain serialization, then perform many cache structure updates, then at the transaction commit point, release serialization. When data sharing members are at distance from the CF 112, in the synchronous XI protocol, the XI signals are delivered and the members complete the invalidation process synchronously before completing each individual command in the transaction, which imposes significant cumulative latency delay.

Aspects of the invention provide a mechanism for improving the performance of data operations in a shared data environment, by delivering invalidation messages or signals asynchronously with respect to the individual originating requests. In one embodiment, the invalidation messages are cross-invalidation (XI) signals. Asynchronously transmitting such signals improves performance by, e.g., reducing or eliminating latency delays. Such improvement is significant in many situations and environments, such as in write-intensive transactions when a cache structure is at distance from data sharing members.

The system 100, or any suitable shared data environment, is configured to perform a method for managing data in a shared data system, which includes the use of asynchronous invalidation signals such as asynchronous XI signals. The method includes receiving at a control device a command from an exploiting member to update a piece of shared data. For example, an exploiting member such as LPAR1 sends a write request to a control device such as the CF 112. The CF 112 determines other members that are registered with respect to the piece of shared data, and transmits an asynchronous XI signal to each registered member indicating that the piece of shared data is no longer valid. The XI signals are transmitted asynchronously, i.e., during or after the write request is completed by the control device, so that processing of the XI signals and processing of the write request can proceed in parallel. The CF 112 performs a check to ensure that all of the members have received and acknowledged the asynchronous XI signals. The CF 112 or other control device can thus avoid delays in processing the write request that are associated with synchronous invalidation methods.

In one embodiment, the method includes an exploiting member commencing a transaction that includes one or more write requests to shared data. For each cache structure update in the transaction, the CF 112 sends an XI signal asynchronously to each registered member of the system 100. At the transaction commit point, before releasing serialization, the exploiting member performs a check to make sure all asynchronous XI signals have been completed.

In one embodiment, cache structure read and write commands that generate asynchronous XI signals are associated with sequence numbers generated and returned on each command. Each sequence number assigned to a command represents the group of asynchronous XI signals initiated by that command and targeted to the complete set of registered users. A set of one or more sequence numbers are generated and maintained by the CF 112 for respective data sharing members that initiate one or more commands that can result in asynchronous XI signals. For example, when a given exploiting member sends a command to update a piece of shared data, a sequence number is issued and maintained in response to that command. The given exploiting member may generate additional commands in processing a program and/or a transaction. When a new command is received from the given exploiting member, another sequence number is issued from a set of ascending consecutive numbers. As each command that results in XI signals is received from the given exploiting member, a sequence number is assigned in ascending consecutive order. It is noted that the process of issuing and maintaining sequence numbers is performed individually for each exploiting member, so that the CF 112 can track XI signals and the exploiting member is kept apprised as to when all XI signals have completed. The sequence numbers can be used on a sync-up request before the transaction is committed to ensure all asynchronous XI signals have completed.

Figure 2:
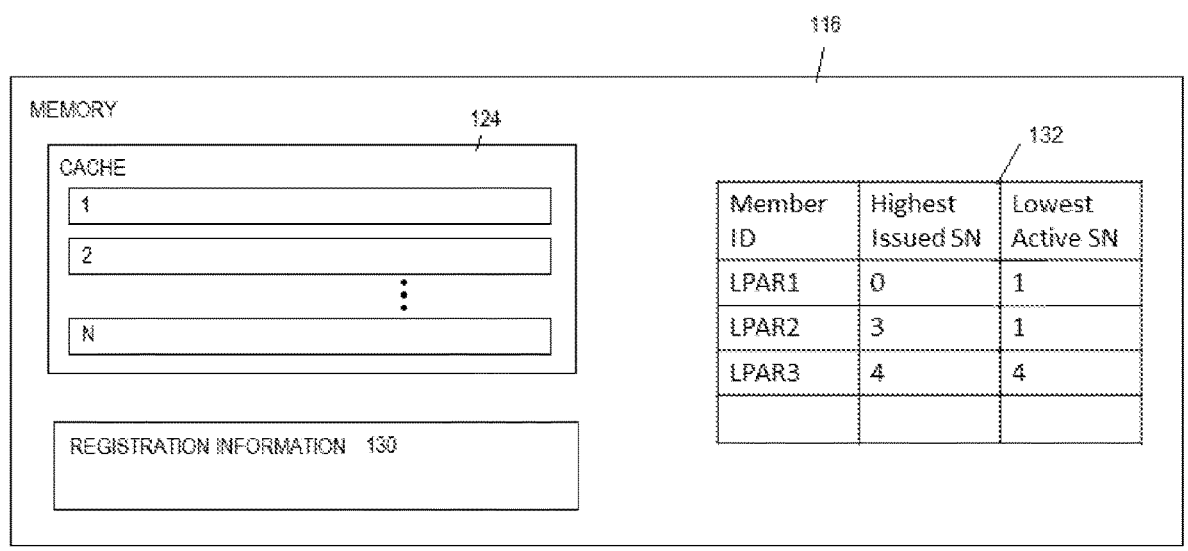
FIG. 2 depicts a cache structure of the control device of FIG. 1 according to one or more embodiments of the present invention.

FIG. 2 shows an embodiment of a data structure that may be maintained by a control device such as the CF 112 for facilitating the methods described herein. As shown, the memory 116 includes at least one shared data cache structure 124 for storing pieces of shared data, which includes a number N of cache lines. The CF 112 also includes registration information 130, such as a registration list or table, for storing registration information that identifies members with registered interest in the shared data. The CF 112 also maintains sequence number information 132 in the form of, e.g., a table or list. The sequence number information 132, for example, is a table identifying each registered member with a member ID, and associating each registered member with one or more sequence numbers. In one embodiment, the sequence numbers assigned to each registered member are consecutive numbers arranged in ascending order. The CF 112 can maintain other information, such as a history of sequence numbers issued for previous commands.

In one embodiment, the CF 112 issues an asynchronous XI sequence number for each data sharing member that sends a command resulting in XI signals. A successive asynchronous XI sequence number is issued for each command from the data sharing member, resulting in a set of sequence numbers.

A set of one or more sequence numbers is maintained separately for each data sharing member. In one embodiment, the sequence numbers are consecutive numbers that are ascending in order. When a data sharing member issues a cache command to update the cache structure 124, the CF 112 sends asynchronous XI signals to other registered data sharing members to invalidate their local copies of the data. Each member may receive one XI signal or a plurality of XI signals for a given command or request. The XI signals can be sent asynchronously to the completion of the command. The CF 112 returns an asynchronous XI sequence number in a response complete message with the results of the command, which represents the outstanding asynchronous XI signals.

For example, if a registered member such as LPAR1 initiates a first command, the CF 112 issues a first sequence number (e.g., 1). The first sequence number is thus associated with the first command. If LPAR1 initiates a second command, the CF 112 issues a second sequence number (e.g., 2) that is successive to and ascending from the first sequence number. The second sequence number is thus associated with the second command. This process is repeated for each new command that is sent to the CF 112 from LPAR1. The CF 112 may keep a history or record of each command and its associated sequence number.

In one embodiment, the CF 112 maintains information including a current sequence number, the lowest active asynchronous XI sequence number and/or highest issued asynchronous XI sequence number for each data sharing member connected to the cache structure. A "current" sequence number is the sequence number representing the group of one or more asynchronous XI signals associated with the current command being processed for a member. An "issued" sequence number refers to a sequence number initially assigned to a data sharing member representing a group of one or more asynchronous XI signals associated with a command for a member. An "active" sequence number refers to a sequence number representing the group of one or more asynchronous XI signals associated with a command for a member which are still outstanding.

The lowest active asynchronous XI sequence number represents the lowest asynchronous XI sequence number with outstanding XI signals for the data sharing member. When all the asynchronous XI signals for a command have completed, the lowest active asynchronous XI sequence number will be updated to the next lowest asynchronous XI sequence number with outstanding XI signals.

The CF 112 may return the lowest active asynchronous XI sequence number in the response complete message on cache structure commands, along with the highest issued asynchronous XI sequence number. Alternatively, the CF 112 may return the highest issued asynchronous XI sequence number along with a delta value that can be used to calculate the lowest active asynchronous XI sequence number.

The OS of the exploiting member tracks the highest issued asynchronous XI sequence number and the lowest active asynchronous XI sequence number for each data sharing member using the information returned in the response complete message. As discussed further below, for a given data sharing member, when the lowest active sequence number is greater than the highest issued sequence number, the data sharing member knows that all of the XI signals have been completed for all of the commands that were sent by the given data sharing member.

FIG. 2 shows an example of sequence numbers assigned to data sharing members. In this example, LPAR1, LPAR2 and LPAR3 are all exploiting members. LPAR1 is in an initial state before any commands have been issued, in which the highest issued sequence number is zero and the lowest active sequence number is one. In this initial state, the lowest active sequence number is greater than the highest issued sequence number, as no commands that result in XI signals have been sent to the CF 112 by LPAR1 (thus there are no outstanding XI signals).

LPAR2 has a highest issued sequence number of 3, meaning that there were three commands sent for which XI signals were generated. The lowest active sequence number is 1, meaning that the XI signals have not yet completed for the group of one or more asynchronous XI signals associated with the command that generated sequence number 1.

LPAR3 has a lowest active sequence number of 4, and a highest issued sequence number of 4, meaning that there is one command remaining for which XI signals are outstanding.

When a sequence number associated with a specific command issued by an exploiting LPAR (or other type of member) is less than the lowest active sequence number, the exploiting LPAR is informed that the XI signals associated with the specific command have completed. In the above example relating to LPAR3, because the lowest active sequence number is greater than sequence numbers 1-3, LPAR3 knows that all of the XI signals for the commands associated with sequence numbers 1-3 have completed.

For a transaction including multiple commands that result in XI signals, once the lowest active sequence number is greater than the highest issued sequence number for the transaction by a respective LPAR, the respective LPAR knows that all XI signals have completed for the transaction.

In the above example relating to LPAR3, when all of the XI signals for the remaining command (associated with sequence number 4) complete, and a subsequent command is issued for the transaction, the CF 112 updates the lowest active sequence number to 5 and sends the updated lowest active sequence number and the highest issued sequence number (if necessary) to LPAR3. For example, when LPAR3 sends a new command after all of the XI signals for commands associated with sequence numbers 1-4 have completed, the new command is assigned sequence number 5. In response to the new command, the CF 112 returns the lowest active sequence number (e.g., sequence number 5) to LPAR3 (e.g., in a response complete message). At this point, LPAR3 knows that all of the XI signals associated with LPAR3's previously issued commands have completed.

Figure 3:
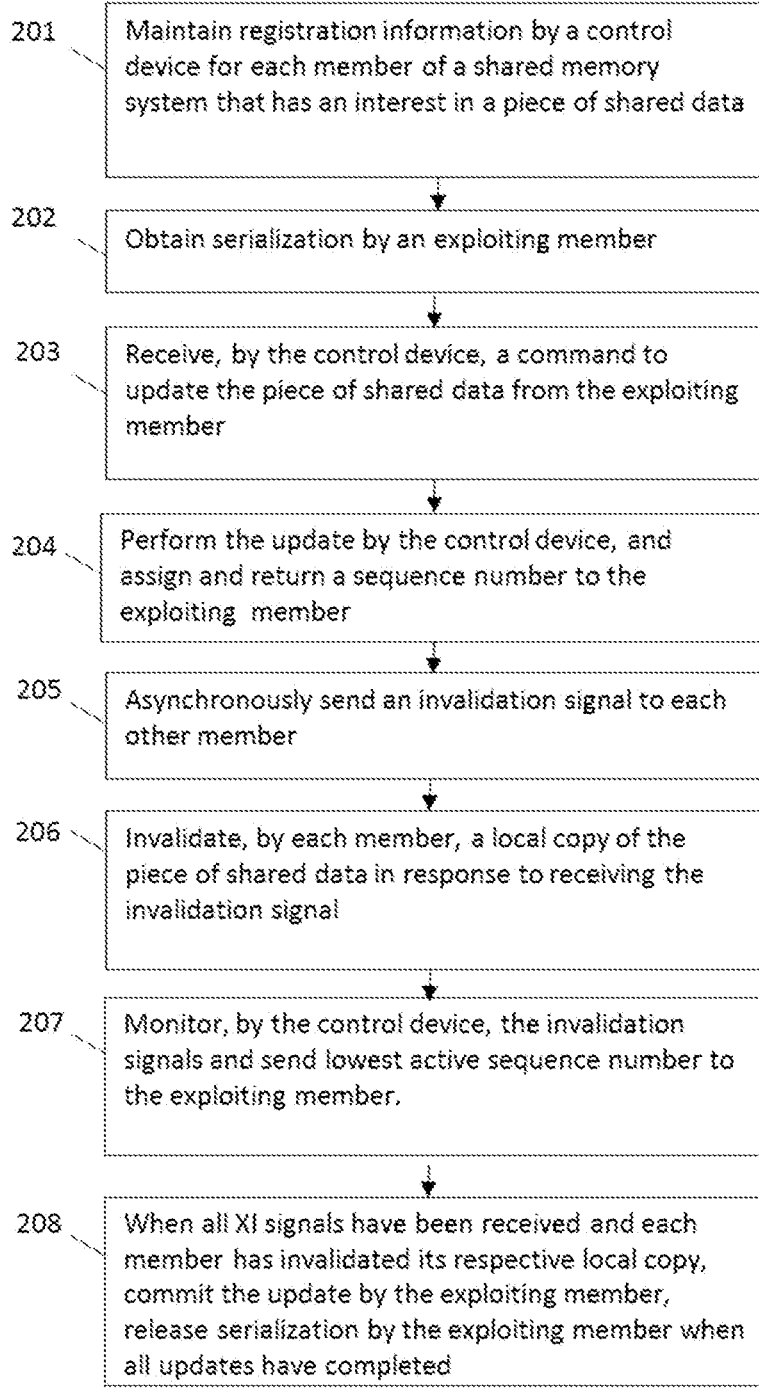
FIG. 3 is a flowchart depicting an embodiment of a method of managing access to a shared memory system.

FIG. 3 illustrates an embodiment of a method 200 for managing shared data in a shared memory system, for example a parallel sysplex such as the system 100. The method 200 may be performed by a processor OS or other suitable application or program. In one embodiment, aspects of the method are performed by a control device or program such as the CF 112, and other aspects are performed by members of the system. Although the method 200 is discussed in conjunction with the system 100, the method 200 is not so limited. The method 200 is discussed in conjunction with blocks 201-208. The method is not limited to the number or order of steps in the method 200, as some steps represented by blocks 201-208 may be performed in a different order than that described below, or fewer than all of the steps may be performed. In addition, some steps may be performed asynchronously or in parallel.

At block 201, the CF 112 maintains registration information for each member that has an interest in a piece of shared data (e.g., a database page). For example, the CF 112 registers each member and stores registration information 130. In this example, the members are denoted as LPAR1-LPAR4.

At block 202, an exploiting member such as LPAR1 obtains serialization for a transaction by issuing a lock request to the CF 112. The CF 112 grants the lock request if no other members hold the lock for the piece of data.

At block 203, the CF 112 receives a command from a member of the sysplex or other shared memory system, such as the LPAR1 (the exploiting member). A member that issues a command for which invalidation signals are generated is referred to as an exploiting member.

The command may be generated as part of a processing task such as a transaction, which is performed by the exploiting member. The processing task may include issuing one or more commands that result in updates to a piece of shared data in the cache structure 124 of the CF 112. A copy of the piece of shared data is stored in a local cache structure of the LPAR1, another copy is stored in the cache structure 124, and other members may also have local copies of the piece of shared data. An example of a piece of shared data is data stored in a cache line, but may be any suitable data structure. For example, LPAR1 invokes a transaction or workload, and as part of the transaction, sends one or more cache commands to the CF 112 for updating a piece of shared data. For example, LPAR1 sends a write request to the cache structure 124.

At block 204, upon receipt of the command, the CF 112 performs the write operation, and assigns a sequence number to LPAR1 if the command results in the transmission of XI signals to other registered members.

The sequence number indicates that there are outstanding XI signals associated with a command, and is maintained by the CF 112 until all outstanding XI signals for all of the commands have completed. In one embodiment, a member is only assigned a sequence number when the member makes an update the cache structure 124. For each exploiting member, if multiple commands result in XI signals, the sequence number is incremented in an ascending order. The CF 112 maintains information including the current sequence number, a lowest active XI sequence number and the highest issued XI sequence number for LPAR1 (the exploiting member).

In the example shown in FIG. 1, a sequence number is assigned to an LPAR when the LPAR issues a command that results in XI signals. As additional commands resulting in XI signals are received, sequence numbers are assigned to the LPAR in consecutive and ascending order.

At block 205, the CF 112 sends asynchronous XI signals to each other registered member of the system 100 to inform the other members that the piece of data is no longer valid. For example, the CF 112 sends a separate asynchronous XI signal to LPAR2, LPAR3 and LPAR4. Unlike prior approaches, the CF 112 issues the XI signals asynchronously, i.e., the CF 112 does not wait for XI signals to complete before processing the write request.

At block 206, each other member, e.g., LPAR2, LPAR3 and LPAR4, receives a respective asynchronous XI signal and invalidates their respective local copies.

At block 207, the CF 112 monitors the XI signals sent to the other registered members (e.g., LPAR2, LPAR3 and LPAR4), and maintains the lowest active sequence number and the highest issued sequence number. The CF 112 may also maintain other information, such as the current sequence number, a record of issued sequence numbers and associated commands, and a record of which XI signals have completed. When all of the XI signals associated with a given sequence number for a given exploiting member (e.g., LPAR1) complete, the CF 112 updates the lowest active sequence number for that member by incrementing the lowest active sequence number, and sends at least the updated lowest active sequence number to the given member. Other information may be sent to the given exploiting member, such as the highest issued sequence number and/or the current sequence number.

For example, at time X, the CF 112 has the lowest active sequence number for member LPAR1 as 1 and the highest issued sequence number as 0. This could mean that no asynchronous XI signals have been generated as a result of any commands issued to CF 112 by LPAR 1. At time X+1, the CF 112 processes a write request that generates asynchronous XI signals. The CF 112 sends an XI signal to the LPAR2, LPAR3, and to LPAR4. At this point, the CF 112 maintains the highest issued sequence number as sequence number 1, and the lowest active sequence number as 1. The lowest active sequence number and the current sequence number are returned to LPAR1 in the response complete message returned with the command. Once all LPARs (LPAR2, LPAR3 and LPAR4) complete the invalidation, the CF 112 is notified and the lowest active sequence number is updated to 2.

LPAR1 monitors the sequence numbers, including the lowest active sequence number and/or the highest issued sequence number, which may be returned in a response complete messages by the CF 112. LPAR1 can track the individual sequence numbers for each issued command, including the current sequence number associated with the command that is currently being processed. Once the lowest active sequence number is greater than highest issued sequence number for the transaction, LPAR1 knows that all of the transmitted asynchronous XI signals have been completed and that all other registered members are aware that their local copies of the piece(s) of data are no longer valid.

The CF 112 can maintain the highest issued sequence number as a highest issued sequence number object. The CF 112 maintains an individual sequence number for each issued command, including the current sequence number associated with the command that is currently being processed.

A sequence number is a current sequence number when the CF 112 is processing the command assigned that sequence number. The CF 112 processes the command (which includes updating data specified by the command and sending asynchronous XI signals), and returns this current sequence number along with the results of the command to the exploiting LPAR, e.g., LPAR1. The current sequence number is obtained, e.g., by incrementing the highest issued sequence number object.

It is noted that commands received from an exploiting member may be tied to different serializations. For example, the exploiting member holds a respective serialization for a given command at least until all of the asynchronous XI signals associated with the given command are completed. Additional commands may be received that are tied to the respective serialization and/or are tied to one or more other serializations.

If the lowest active sequence number is greater than a specific current sequence number, the exploiting member may release the serialization for the current sequence number if there are no more outstanding commands tied to that serialization. The highest issued sequence number could continue to grow due to new commands coming in from the same exploiting member that are tied to one or more different serializations.

If the lowest active sequence number is greater than the highest issued sequence number, then it means that there are no active asynchronous XIs and all serializations held by the exploiting member can be released.

It is noted that a transaction or workload may include a plurality of updates to multiple memory locations. For example, the transaction discussed above may include multiple write commands. Blocks 203-206 are performed for each piece of data that is updated by the transaction. Due to the fact that all the sequence numbers representing asynchronous XI signals are ascending, the member only needs to ensure that the lowest active sequence number is greater than the highest issued sequence number for a transaction to confirm all asynchronous XI signals have completed for all commands in the transaction.

At block 208, the exploiting member determines whether all of the XI signals have completed. In one embodiment, the exploiting member exploits a sync-up service to determine whether all of the XI signals have completed. When all of the asynchronous XI signals have completed and all of the updates performed, the exploiting member (e.g., LPAR1) issues a transaction commit to make permanent the updates that are part of the transaction. The lock is removed to release serialization and allow other members to access the piece of data.

In one embodiment, each member (e.g., each OS) provides a sync-up interface that allows data sharing members to determine whether all outstanding XI signals associated with an asynchronous XI sequence number have been completed. In one embodiment, a sequence number or numbers returned to an exploiting member (e.g., in a response complete message) is used by the exploiting member to perform a sync-up operation provided by the sync-up interface. The interface provides the option of suspending until the asynchronous XI signals associated with the input asynchronous XI sequence number have completed or returning with an indication of whether the asynchronous XI signals have completed. The data sharing member is expected to delay processing until all asynchronous XI signals of interest have reached completion before releasing serialization for the transaction.

For example, before releasing serialization, an exploiting member uses the sync-up interface to ensure that there are no more outstanding XI signals for that transaction before completing a transaction or program. Once the sync-up is complete and there are no more outstanding XI signals, the exploiting member can commit the transaction and release serialization.

It is possible that a member exploiting asynchronous cross-invalidates fails during processing of a transaction and/or command. If a data-sharing member exploiting asynchronous cross-invalidation fails during a transaction, asynchronous XI signals may still be in flight and peer data sharing members are not yet aware that the local instances of data they are maintaining are no longer valid. Thus, the system 100, in one embodiment, is configured to perform a recovery method that ensures data integrity in the event of a failed member. An algorithm is provided that coordinates between an operating system (OS), the CF 112, and the exploiting member that ensures that data integrity is maintained.

The algorithm has the following components. If a member fails, the OS notifies surviving members of the failure of the peer member and waits for the survivors to acknowledge, individually and explicitly, the failure of the peer.

Before acknowledging the failure, surviving members investigate and transfer ownership of the serialization that was held by the failed member. During this phase, the survivors collectively ensure that no survivor can inspect or modify any resource that was serialized by the failed member. This "lockout" state persists until it can be ensured that no cross-invalidate signals initiated by the failed member are still in flight.

After all survivors have acknowledged the peer's failure, the OS initiates a detach command to the CF 112 to terminate the connection of the failed peer to the shared memory (e.g., the cache structure 124). The detach command quiesces all outstanding XI signals that are still in flight, and completes after all remaining XI signals have completed.

The exploiting member and the OS coordinate to ensure that resource serialization is not released until the detach completes. One way in which this can be accomplished is to require the failed data sharing member to "reconnect" to the shared memory, thus establishing a new instance of the failed member. Since reconnect does not complete until detach has completed, this ensures that outstanding XIs have been delivered. The exploiting member is now free to release serialization and make the in-doubt resources available to other members.

In one embodiment, the CF 112 is configured to perform asynchronous XI processing and response complete message processing on the same thread. By using the actively dispatched thread, the CF 112 avoids the overhead of creating a background work block that would need to be dispatched with potential context switching costs to process the asynchronous XI signals to completion. In this embodiment, the CF 112 can process the asynchronous XI signals ahead of other post-response complete message processing for the active thread. The CF 112 records information about the cross-invalidations only for the active thread. In this way, serialization requirements are reduced as only the active thread has access and does not require further serialization within the CF 112.

The CF 112 in this embodiment moves processing for these asynchronous cross-invalidations from being performed before response complete message processing to being performed after response complete message processing. Prioritizing the completion of asynchronous cross-invalidates reduces the time the data sharing member must hold serialization for this transaction.

An embodiment of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

As used herein, the articles "a" and "an" preceding an element or component are intended to be nonrestrictive regarding the number of instances (i.e., occurrences) of the element or component. Therefore, "a" or "an" should be read to include one or at least one, and the singular word form of the element or component also includes the plural unless the number is obviously meant to be singular.

As used herein, the terms "invention" or "present invention" are non-limiting terms and not intended to refer to any single aspect of the particular invention but encompass all possible aspects as described in the specification and the claims.

As used herein, the term "about" modifying the quantity of an ingredient, component, or reactant of an aspect of the invention employed refers to variation in the numerical quantity that can occur, for example, through typical measuring and liquid handling procedures used for making concentrates or solutions. Furthermore, variation can occur from inadvertent error in measuring procedures, differences in the manufacture, source, or purity of the ingredients employed to make the compositions or carry out the methods, and the like. In one aspect, the term "about" means within 10% of the reported numerical value. In another aspect, the term "about" means within 5% of the reported numerical value. Yet, in another aspect, the term "about" means within 10, 9, 8, 7, 6, 5, 4, 3, 2, or 1% of the reported numerical value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
   a shared memory accessible by a plurality of members of a shared memory system; and
   a processor operably coupled to the shared memory system, the processor configured to perform:
   receiving a command from an exploiting member of the plurality of members, the command instructing an update to a piece of shared data, wherein the command is one of a plurality of commands sent by the exploiting member, each of the plurality of commands initiating at least one invalidation signal;

issuing a sequence number to the exploiting member in response to the command, the sequence number part of a plurality of successive sequence numbers;

performing the update to the piece of shared data;

sending an invalidation signal to each other member of the plurality of members, wherein an invalidation signal sent to a respective member indicates that a local copy of the piece of data stored by the respective member is no longer valid, wherein each invalidation signal is sent asynchronously with respect to processing of the command;

returning results of the command to the exploiting member; and for each subsequent command in the plurality of commands, issuing a successive sequence number in an ascending order, wherein the processor is configured to maintain a highest issued sequence number indicating the highest sequence number that was issued for the exploiting member.

2. The system of claim 1, wherein the memory system is part of a parallel system complex, the processor is included in a coupling facility, and each invalidation signal is a cross-invalidation (XI) signal.

3. The system of claim 2, wherein the piece of shared data is stored in a cache structure in the coupling facility.

4. The system of claim 1, wherein the processor is configured to:
return one or more of the issued sequence numbers to the exploiting member to notify the exploiting member that at least one invalidation signal has not completed.

5. The system of claim 4, wherein each sequence number is associated with a different command from the exploiting member that initiated at least one invalidation signal.

6. The system of claim 4, wherein the processor is configured to maintain a history of sequence numbers assigned to previous commands in the plurality of commands.

7. The system of claim 1, wherein the processor is configured to maintain a lowest active sequence number indicating the lowest sequence number associated with a command for which there are outstanding invalidation signals.

8. The system of claim 7, wherein the processor is configured to send the lowest active sequence number and the highest issued sequence number to the exploiting member, the exploiting member determining whether all of the commands and all invalidation signals associated with the commands have completed based on a comparison of the lowest active sequence number to the highest issued sequence number.

9. The system of claim 1, wherein based on one of the members being a failed member, the processor is configured to issue a detach command to disconnect the failed member from the shared memory system.

10. The system of claim 1, wherein, based on one of the members being a failed member, the processor is configured to issue a detach command to disconnect the failed member from the shared memory system, and cause the failed member to attempt to reconnect as a new instance to the shared memory system.

11. A method of managing access to shared data stored in a shared memory system, the method comprising:
receiving a command by a processor from an exploiting member of a plurality of members of the shared memory system, the plurality of members having access to the shared memory, the command instructing an update to a piece of shared data, wherein the command is one of a plurality of commands sent by the exploiting member, each of the plurality of commands initiating at least one invalidation signal;

issuing a sequence number to the exploiting member in response to the command, the sequence number part of a plurality of successive sequence numbers;

performing the update to the piece of shared data;

sending an invalidation signal to each other member of the plurality of members, wherein an invalidation signal sent to a respective member indicates that a local copy of the piece of data stored by the respective member is no longer valid, wherein each invalidation signal is sent asynchronously with respect to processing of the command;

returning results of the command to the exploiting member; and for each subsequent command in the plurality of commands, issuing a successive sequence number in an ascending order, and maintaining by the processor a highest issued sequence number indicating the highest sequence number that was issued for the exploiting member.

12. The method of claim 11, further comprising:
returning one or more of the issued sequence numbers to the exploiting member to notify the exploiting member that at least one invalidation signal has not completed.

13. The method of claim 12, wherein each sequence number is associated with a different command from the exploiting member that initiated at least one invalidation signal.

14. The method of claim 12, further comprising maintaining by the processor a history of sequence numbers assigned to previous commands in the plurality of commands.

15. A computer program product comprising a computer readable storage medium having program instructions embodied therewith, the program instructions executable by a processing system to perform:
receiving a command by a processor from an exploiting member of a plurality of members of the shared memory system, the plurality of members having access to the shared memory, the command instructing an update to a piece of shared data, wherein the command is one of a plurality of commands sent by the exploiting member, each of the plurality of commands initiating at least one invalidation signal;

issuing a sequence number to the exploiting member in response to the command, the sequence number part of a plurality of successive sequence numbers;

performing the update to the piece of shared data;

sending an invalidation signal to each other member of the plurality of members, wherein an invalidation signal sent to a respective member indicates that a local copy of the piece of data stored by the respective member is no longer valid, wherein each invalidation signal is sent asynchronously with respect to processing of the command;

returning results of the command to the exploiting member; and for each subsequent command in the plurality of commands, issuing a successive sequence number in an ascending order, and maintaining a highest issued sequence number indicating the highest sequence number that was issued for the exploiting member.

16. The computer program product of claim 15, wherein the processor is configured to perform:

returning one or more of the issued sequence numbers to the exploiting member to notify the exploiting member that at least one invalidation signal has not completed.

17. The computer program product of claim 16, wherein each sequence number is associated with a different command from the exploiting member that initiated at least one invalidation signal, and the processor is configured to maintain a history of sequence numbers assigned to previous commands in the plurality of commands.

* * * * *